US012501400B2

(12) United States Patent
Hong

(10) Patent No.: US 12,501,400 B2
(45) Date of Patent: Dec. 16, 2025

(54) METHOD AND APPARATUS FOR PAGING, AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 298 days.

(21) Appl. No.: 18/248,676

(22) PCT Filed: Oct. 12, 2020

(86) PCT No.: PCT/CN2020/120496
§ 371 (c)(1),
(2) Date: Apr. 11, 2023

(87) PCT Pub. No.: WO2022/077188
PCT Pub. Date: Apr. 21, 2022

(65) Prior Publication Data
US 2023/0388965 A1    Nov. 30, 2023

(51) Int. Cl.
*H04W 68/00* (2009.01)
*H04W 8/24* (2009.01)
(Continued)

(52) U.S. Cl.
CPC ........... *H04W 68/005* (2013.01); *H04W 8/24* (2013.01); *H04W 60/005* (2013.01); *H04W 60/04* (2013.01); *H04W 88/06* (2013.01)

(58) Field of Classification Search
CPC ... H04W 68/005; H04W 8/24; H04W 60/005; H04W 60/04; H04W 88/06
See application file for complete search history.

(56) References Cited

U.S. PATENT DOCUMENTS

2021/0352618 A1* 11/2021 Yang ................... H04W 8/183
2023/0106205 A1*  4/2023 Zhang ................. H04W 60/00
                                                                 455/435.1

FOREIGN PATENT DOCUMENTS

CN    110831148 A    2/2019
CN    110249605 A    9/2019
(Continued)

OTHER PUBLICATIONS

"KI#2,3: new solution: notification via UDM to secondary registration in other USIM PLMN," Proceedings of the SA WG2 Meeting #140-e, Nokia, Nokia Shanghai Bell, S2-2005043, Aug. 19, 2020, 8 pages.

*Primary Examiner* — Kathy W Wang-Hurst
(74) *Attorney, Agent, or Firm* — McCoy Russell LLP

(57) ABSTRACT

A paging method, comprising: determining that a paging enhancement condition is met by a first universal subscriber identity (USIM) card, said first USIM card reporting a first registration request message carrying first status information to a first network device: said first status information is used for indicating that the status corresponding to a target terminal capability of a multi-card terminal is a first status, said target terminal capability being used for indicating the capability of said multi-card terminal to support a plurality of USIM cards, said first status being used for indicating the existence of a plurality of USIM cards in a successfully registered status; and determining that the status corresponding to said target terminal capability is said first status, triggering a second USIM card, which is already in said successful registration status, to perform a registration update process.

20 Claims, 10 Drawing Sheets

(51) Int. Cl.
    *H04W 60/00*     (2009.01)
    *H04W 60/04*     (2009.01)
    *H04W 88/06*     (2009.01)

(56) References Cited

FOREIGN PATENT DOCUMENTS

| | | |
|---|---|---|
| CN | 111526579 A | 8/2020 |
| WO | 2020147815 A1 | 7/2020 |
| WO | 2020191767 A1 | 10/2020 |

* cited by examiner

METHOD AND APPARATUS FOR PAGING, AND STORAGE MEDIUM

CROSS REFERENCE TO RELATED APPLICATION

The present application is a U.S. National Phase of International Application No. PCT/CN2020/120496 entitled "PAGING METHOD AND APPARATUS AND STORAGE MEDIUM," and filed on Oct. 12, 2020. The entire contents of the above-listed application is hereby incorporated by reference for all purposes.

BACKGROUND

Currently, a wide range of smart terminals possess the ability to support numerous universal subscriber identity module (USIM) cards. The USIM cards supported by the same terminal are allowed to be from the same operator or from different operators. For example, according to services and tariffs provided by different operators, one of the USIM cards will be selected to answer calls, while at least one of the other USIM cards will be selected to receive data.

SUMMARY

The disclosure relates to the field of communications, and in particular to a method and apparatus for paging, and a storage medium.

Examples of the disclosure provide a method and apparatus for paging, and a storage medium.

According to a first aspect of an example of the disclosure, a method for paging is provided. The method is performed by a multi-card terminal, and includes:
  determining, by means of a first universal subscriber identity module (USIM) card, that a paging enhancement condition is satisfied, reporting, by the first USIM card, a first registration request message carrying first state information to a first network device, where the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and
  determining that the state corresponding to the target terminal capability is the first state, triggering a second USIM card that is already in the successfully registered state to execute a registration update process.

According to a second aspect of an example of the disclosure, a method for paging is provided. The method is performed by a network device, and includes:
  receiving a target registration request message carrying first state information reported by a multi-card terminal by means of a target USIM card, where the target USIM card is any USIM card in the multi-card terminal, the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and
  according to the first state information, determining an enhanced target paging mode corresponding to the target USIM card.

According to a third aspect of an example of the disclosure, a non-transitory computer-readable storage medium is provided, the computer-readable storage medium stores a computer program, where the computer program is used for executing the method for paging of the first aspect above.

According to a fourth aspect of an example of the disclosure, a non-transitory computer-readable storage medium is provided, the computer-readable storage medium stores a computer program, where the computer program is used for executing the method for paging of the second aspect above.

According to a fifth aspect of an example of the disclosure, an apparatus for paging is provided, includes:
  a processor; and
  a memory for storing a processor-executable instruction, where
  the processor is configured to:
  determine, by means of a first universal subscriber identity module (USIM) card, that a paging enhancement condition is satisfied, reporting, by the first USIM card, a first registration request message carrying first state information to a first network device, where the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and
  determine that the state corresponding to the target terminal capability is the first state, triggering a second USIM card that is already in the successfully registered state to execute a registration update process.

According to a sixth aspect of an example of the disclosure, an apparatus for paging is provided, includes:
  a processor; and
  a memory for storing a processor-executable instruction, where
  the processor is configured to execute the method for paging of the second aspect above.

It should be understood that the above general description and the following detailed description are merely illustrative and explanatory, and cannot limit the disclosure.

BRIEF DESCRIPTION OF THE DRAWINGS

The accompanying drawings here are incorporated into the description as a constituent part of the description, illustrate examples conforming to the disclosure, and serve to explain principles of the examples of the disclosure along with the description.

DETAILED DESCRIPTION

Figure 1:
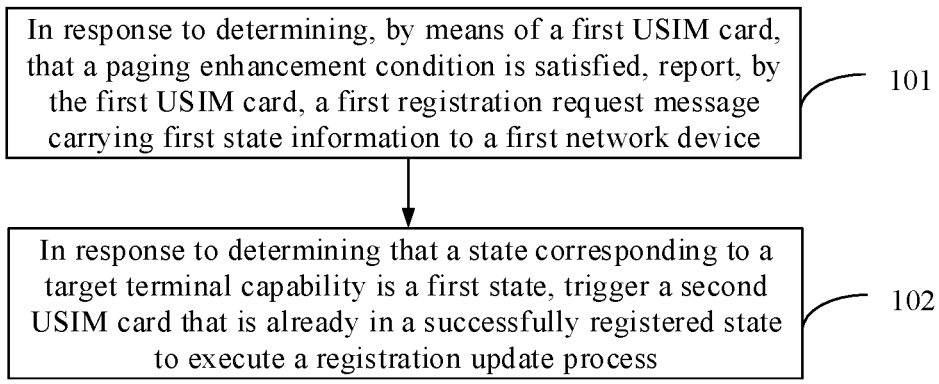
FIG. 1 is a schematic flow diagram of a method for paging shown according to an example.

The examples will be described in detail here, instances of which are shown in the accompanying drawings. When the following descriptions involve the accompanying drawings, unless otherwise specified, the same numeral in different accompanying drawings denotes the same or similar elements. The embodiments described in the following examples do not denote all embodiments consistent with the disclosure. On the contrary, the embodiments are merely examples of an apparatus and a method consistent with some aspects of the disclosure as detailed in the appended claims.

The terms used in the disclosure are merely to describe the specific examples, instead of limiting the disclosure. The singular forms such as "a," "an," "the," and "this," used in the disclosure and the appended claims are also intended to include the plural forms, unless otherwise clearly stated in the context. It should also be understood that the term "and/or" used here refers to and includes any of one or more of the associated listed items or all possible combinations.

It should be understood that although the terms of first, second, third, etc. can be used in the disclosure to describe various types of information, such information should not be limited to these terms. These terms are merely used to distinguish the same type of information from each other. For example, without departing from the scope of the disclosure, the first information may also be referred to as second information, and similarly, the second information may also be referred to as first information. Depending on the context, the word if as used here can be interpreted as "at the time of," "when," or "in response to determining."

A plurality of USIM cards supported by the same terminal, however, when one of the USIM cards is running a service, a network side is likely to fail in paging another USIM card of the terminal.

A plurality of implementation solutions are provided in release 17 (R17) of a 3rd generation partnership project (3GPP) for how at least one of other universal subscriber identity module (USIM) cards receives a paging message when one of USIM cards of the same terminal is executing a service. The following implementation solutions are illustrated by taking a multi-card terminal including a first USIM card and a second USIM card as an example. In practical applications, the multi-card terminal may include more USIM cards.

First mode: in solutions 7, 8, and 12, a paging message from another system is sent by means of a user side of a current system.

The current system refers to a system that is executing a service. Another system refers to a system corresponding to a USIM card that needs to be paged.

However, in such a mode, system paging may be delayed, and different USIM cards need to additionally maintain a set of paging channels of a user side, such that a system cost is high, and inter-working between a plurality of USIM cards may involve a privacy issue.

Second mode: in solution 17, the terminal may assist a network device in developing a paging mode by reporting multi-USIM (MUSIM) assistance information.

However, in such a mode, the network device needs to separately detect whether the terminal is a MUSIM device after both the first USIM card and the second USIM card are successfully registered. In this case, the first USIM card and the second USIM card need to be re-registered. Equivalently, 4 network registration processes are needed in total under the condition that the multi-card terminal supports 2 USIM cards, resulting in high signaling overheads.

In addition, in such a mode, once the multi-card terminal enters a single USIM card state, for example, under the condition that a user removes the second USIM card and merely retains the first USIM card, the network side does not receive any indication information from the terminal, and may still page different SIM cards according to a previously developed paging mode. Vice versa.

Third mode: in solution 18, a paging mode is directly changed.

When the network device does not receive feedback from the first USIM card in a first paging opportunity when paging a certain USIM card, such as the first USIM card, an enhanced paging mode may be immediately used in a second paging opportunity, so as to increase a probability of the first USIM card to successfully receive a paging message.

However, in such a mode, when paging enhancement is immediately carried out on the first USIM card since the network device does not timely receive paging feedback due to poor coverage or ongoing feedback, additional paging overheads may be caused.

In order to solve the problems of the above solutions, the disclosure provides a paging solution that may improve a success rate of the other USIM cards to receive paging messages of a multi-card terminal when any USIM card executes a service.

The paging solution provided in the disclosure will be introduced below from a multi-card terminal side.

An example of the disclosure provides a method for paging. With reference to FIG. 1, FIG. 1 being a schematic flow diagram of a method for paging shown according to an example, the method may be used for a multi-card terminal, including the following steps 101 and 102.

In step 101, in response to determining, by means of a first USIM card, that a paging enhancement condition is satisfied, report, by the first USIM card, a first registration request message carrying first state information to a first network device.

In the example of the disclosure, the first USIM card is a USIM card that has not been successfully registered on a network side, and there may be one or more first USIM cards, which is not limited in the disclosure. The first USIM card may determine whether a paging enhancement condition is satisfied after a multi-card terminal is powered on. The paging enhancement condition may include at least one of:

a state corresponding to a target terminal capability is already a first state; and a state corresponding to a target terminal capability is a second state, the second state is used for indicating presence of one USIM card in a successfully registered state, and the USIM card in the successfully registered state is different from the first USIM card.

The first state information is used for indicating that the state corresponding to the target terminal capability of the multi-card terminal is the first state, the target terminal capability is used for indicating a capability of the multi-card terminal to support a plurality of USIM cards, and the first state is used for indicating presence of a plurality of USIM cards in the successfully registered state. Correspondingly, the second state is used for indicating presence of one USIM card in the successfully registered state, and in this case, there is merely one USIM card in the successfully registered state, or the second state is used for indicating absence of USIM cards in the successfully registered state.

In the example of the disclosure, under the condition that the state corresponding to the target terminal capability is already the first state, the first USIM card determines that the paging enhancement condition is satisfied, and the first registration request message carrying the first state information may be reported to the first network device. Alternatively, the second state is used for indicating presence of one USIM card in the successfully registered state. That is, merely one USIM card is currently present in the successfully registered state, and the USIM card in the successfully registered state is different from the first USIM card. In this case, the first USIM card may also determine that the paging enhancement condition is satisfied, and the first registration request message carrying the first state information may be reported to the first network device. The second state is used for indicating that without the USIM card in the successfully registered state, the first USIM card may be registered online according to an existing network registration process.

In one example, the first state may be active, and the second state may be deactive.

The state corresponding to the target terminal capability is active, which shows that the multi-card terminal currently has 2 or more USIM cards in the successfully registered state. The state corresponding to the target terminal capability is deactive, which shows that the multi-card terminal currently has merely one USIM card in the successfully registered state, or that the multi-card terminal currently has no USIM card in the successfully registered state.

In step 102, in response to determining that the state corresponding to the target terminal capability is the first state, trigger a second USIM card that is already in the successfully registered state to execute a registration update process.

In the example of the disclosure, when the multi-card terminal determines that the state corresponding to the target terminal capability is the first state, that is, when the multi-card terminal currently has two or more USIM cards in the successfully registered state, the second USIM card that is already in the successfully registered state on the multi-card terminal needs to execute the registration update process, and is registered with a corresponding second network device anew. The second network device and the above first network device may be the same or different, and there may be one or more second USIM cards, which is also not limited in the disclosure.

In the above example, either the first USIM card that is not already in the successfully registered state or the second USIM card that is already in the successfully registered state may be registered on the network side by using the above mode, such that paging messages sent by the corresponding network devices by means of an enhanced paging mode are subsequently received, and a success rate of the other USIM cards to receive paging messages when one of the USIM cards of the multi-card terminal executes a service.

Figure 2:
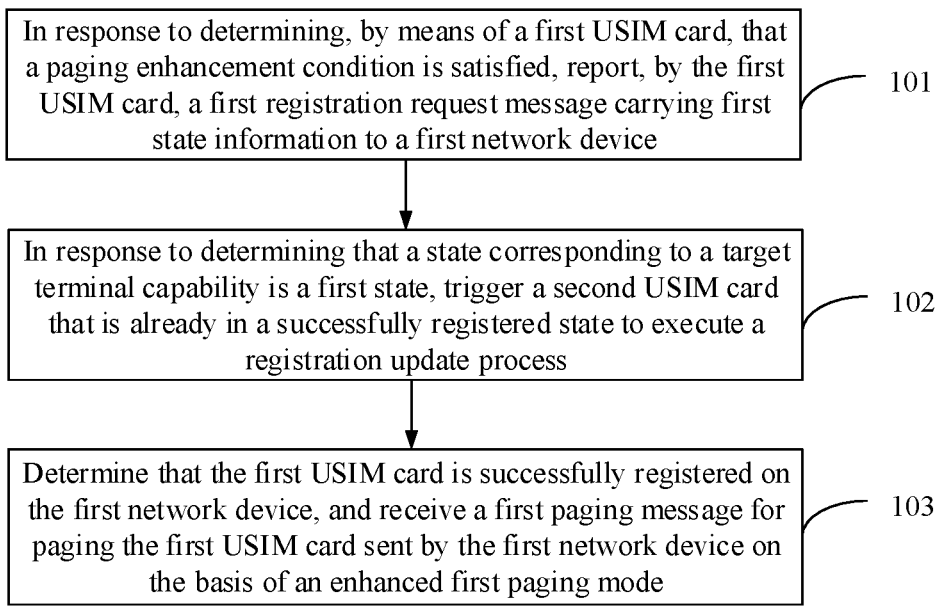
FIG. 2 is a schematic flow diagram of another method for paging shown according to an example.

In an alternative example, with reference to FIG. 2, FIG. 2 being a schematic flow diagram of another method for paging shown according to the example shown in FIG. 1, the method may further include the following step 103.

In step 103, determine that the first USIM card is successfully registered on the first network device, and receive a first paging message for paging the first USIM card sent by the first network device based on an enhanced first paging mode.

In the example of the disclosure, when the multi-card terminal receives a first registration acceptance message carrying the first state information, sent by the first network device, it may be determined that the first USIM card is successfully registered on the first network device. Moreover, the first network device has already determined the enhanced first paging mode for the first USIM card. Subsequently, under the condition that the first network device needs to page the first USIM card, the first network device may send a first paging message based on the enhanced first paging mode to page the first USIM card.

In the example of the disclosure, the enhanced first paging mode may be a paging mode enhanced based on the mode of previously paging the first USIM card. For example, after the first USIM card is paged for the preset number of times in a certain paging opportunity, the first network device may not page the first USIM card until a next paging opportunity arrives. The enhanced first paging mode may be to page the first USIM card anew after an interval of time T after the first USIM card is paged for the preset number of times in a current paging opportunity. T may be predetermined in a protocol.

In another example, after the first USIM card is paged for the preset number of times in a certain paging opportunity, the first network device may not page the first USIM card anew until a next paging opportunity arrives. The enhanced first paging mode may increase the number of times to page the first USIM card in a current paging opportunity, which exceeds the previous preset number of times.

What is described above is merely an illustrative explanation, and in practical applications, the enhanced first paging mode may further use other modes.

In the above example, after the first USIM card is successfully registered based on the first registration request message carrying the first state information, the first network device may use the enhanced first paging mode for paging when needing to page the first USIM card, thus improving a success rate of the other USIM cards to receive paging messages when one of the USIM cards of the multi-card terminal executes a service.

Figure 3:
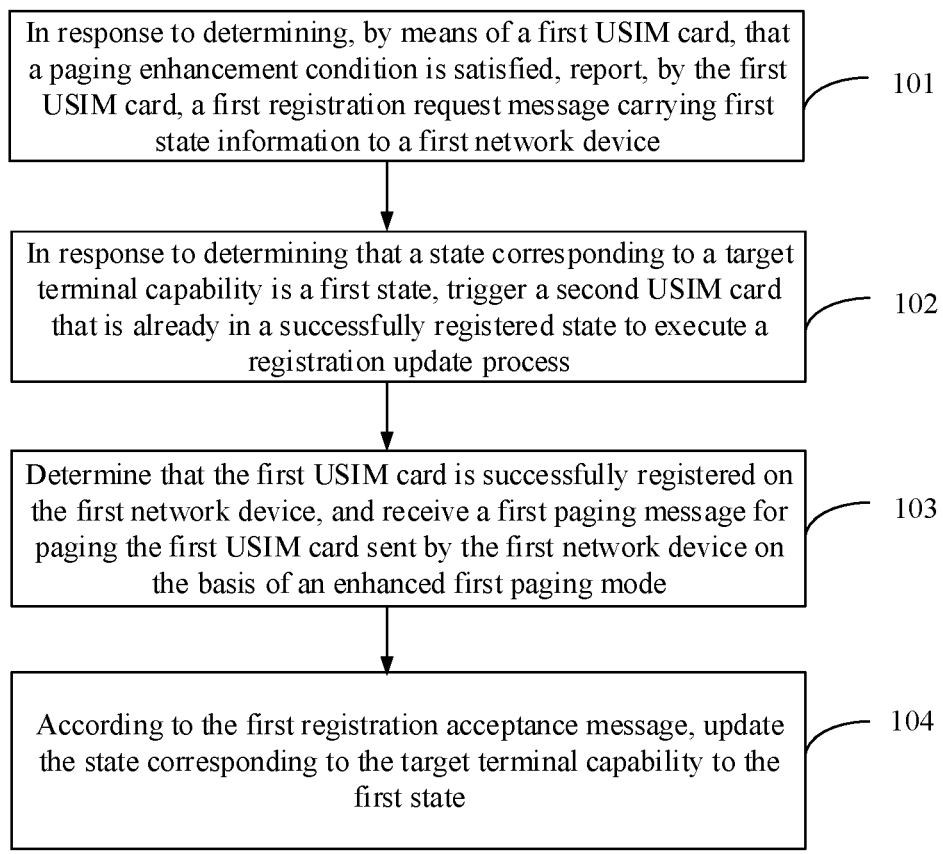
FIG. 3 is a schematic flow diagram of yet another method for paging shown according to an example.

In an alternative example, with reference to FIG. 3, FIG. 3 being a schematic flow diagram of yet another method for paging shown according to the example shown in FIG. 2, under the condition that a state corresponding to a target terminal capability is a second state and the second state is used for indicating presence of on USIM card in the successfully registered state, the method further includes the following step 104.

In step 104, according to the first registration acceptance message, update the state corresponding to the target terminal capability to the first state.

In the example of the disclosure, when the first USIM card reports the first registration request message, the state corresponding to the target terminal capability is a deactive state, and the second state is used for indicating presence of one USIM card in the successfully registered state. That is, merely one USIM card is in the successfully registered state. After the first USIM card is successfully registered, the state corresponding to the target terminal capability may be updated to an active state according to the received first registration acceptance message. That is, the state corresponding to the target terminal capability is updated to a plurality of USIM cards being currently in the successfully registered state, such that the second USIM card that is already in the successfully registered state is triggered to execute the registration update process.

In the above example, under the condition that the state corresponding to the target terminal capability is the second state, and the second state is used for indicating presence of one USIM card in the successfully registered state, after the first USIM card is successfully registered, the state corresponding to the target terminal capability may be timely updated, such that the second USIM card that is already in the successfully registered state is triggered to execute the registration update process, thus improving a success rate of the other USIM cards to receive paging messages when one of the USIM cards of the multi-card terminal executes a service.

Figure 4:
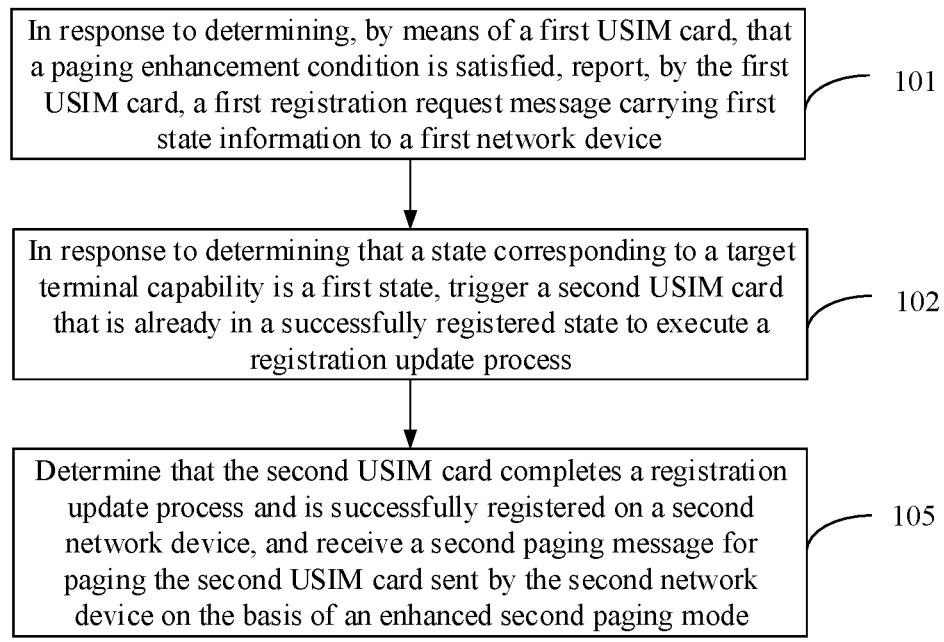
FIG. 4 is a schematic flow diagram of yet another method for paging shown according to an example.

In an alternative example, with reference to FIG. 4, FIG. 4 being a schematic flow diagram of yet another method for paging shown according to the example shown in FIG. 1, the method may further include the following step 105.

In step 105, determine that the second USIM card completes the registration update process and is successfully registered on a second network device, and receive a second paging message for paging the second USIM card sent by the second network device based on an enhanced second paging mode.

In the example of the disclosure, when the second USIM card is registered, updated and successfully registered on the second network device, the second network device may also correspondingly determine the enhanced second paging mode for the second USIM card. Under the condition that the second USIM card needs to be paged, the second network device may send the second paging message for paging the second USIM card based on the enhanced second paging mode. The second USIM card receives the second paging message. The enhanced second paging mode may be the same as or different from the enhanced first paging mode, which is node limited in the disclosure.

In the above example, after the second USIM card is successfully re-registered based on the second registration request message carrying the first state information, the second network device may use the enhanced second paging mode for paging when needs to page the second USIM card, thus improving a success rate of the other USIM cards to receive paging messages when one of the USIM cards of the multi-card terminal executes a service.

In an alternative example, step 102 may include: report, by the second USIM card, a second registration request message carrying the first state information to the second network device.

In the example of the disclosure, the second USIM card may be re-registered on the second network device by reporting the second registration request message carrying the first state information, such that the second network device determines the enhanced second paging mode corresponding to the second USIM card.

Correspondingly, step 105 of determining that the second USIM card completes the registration update process and is successfully registered on a second network device may include:

in response to receiving a second registration acceptance message carrying the first state information returned by the second network device, determine that the second USIM card completes the registration update process and is successfully registered on the second network device.

In the example of the disclosure, when the second registration acceptance message carrying the first state information transmitted by the second network device is received, it may be determined that the second USIM card completes the registration update process and is successfully registered on the second network device. Subsequently, the second network device may page the second USIM card based on the enhanced second paging mode.

In the above example, the second USIM card that is already in a successfully registered state may be registered anew on the second network device by reporting the second registration request message carrying the first state information, such that the objective of improving a success rate of the other USIM cards to receive paging messages when one USIM card of the multi-card terminal executes a service is also achieved.

Next, the paging solution provided by the example of the disclosure will be introduced below from a network device.

Figure 5:
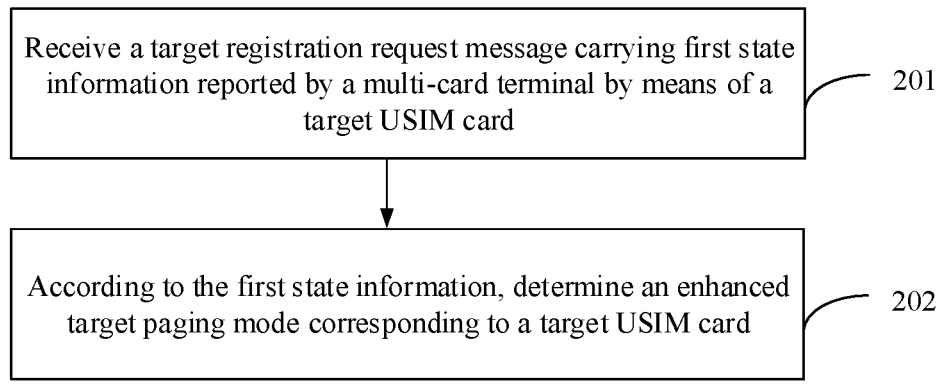
FIG. 5 is a schematic flow diagram of yet another method for paging shown according to an example.

An example of the disclosure provides another method for paging. With reference to FIG. 5, FIG. 5 being a schematic flow diagram of yet another method for paging shown according to an example, the method for paging may be used for a network device that may include, but not limited to, an access network device (AN), and may include the following steps 201 and 202.

In step 201, receive a target registration request message carrying first state information reported by a multi-card terminal by means of a target USIM card.

In the example of the disclosure, the target USIM card may be any SIM card in the multi-card terminal, and includes a first USIM card that has not been successfully registered on the network device and a second USIM card that is already successfully registered on the network device. There may be one or more first USIM cards, and one or more second USIM cards. When the target USIM card is the first USIM card, the target registration request message is the above first registration request message. When the target USIM card is the second USIM card, the target registration request message is the above second registration request message.

The first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state.

step 202, according to the first state information, determine an enhanced target paging mode corresponding to the target USIM card.

In the example of the disclosure, according to the first state information, the network device directly enhances the paging mode of paging the target USIM card, so as to determine the enhanced target paging mode. In some examples, the network device may select any one of a plurality of preset enhanced paging modes as the target paging mode for the target USIM card, or select one preset enhanced paging mode as the target paging mode according to preset rules.

In an example, the determined target paging mode may be to page the target USIM card anew after an interval of time T. In another example, the determined target paging mode may be to increase the number of times of paging of paging the target USIM card.

When the target USIM card is the first USIM card, the target paging mode is the above enhanced first paging mode. When the target USIM card is the second USIM card, the target paging mode is the above enhanced second paging mode.

In the above example, the network device may receive the target registration request message carrying the first state information reported by the multi-card terminal by means of any USIM card, i.e., the target USIM card. According to the first state information, the network device determines the enhanced target paging mode corresponding to the target USIM card. Subsequently, the target USIM card is paged based on the enhanced target paging mode under the condition that the target USIM card is successfully registered, and it is determined that the target USIM card needs to be paged. The disclosure may use the enhanced target paging mode to page the USIM card according to the first state information carried in the target registration request message reported by any USIM card of the multi-card terminal, such that the objective of improving a success rate of the other USIM cards to receive paging messages when one of the USIM cards of the multi-card terminal executes a service is also achieved.

Figure 6:
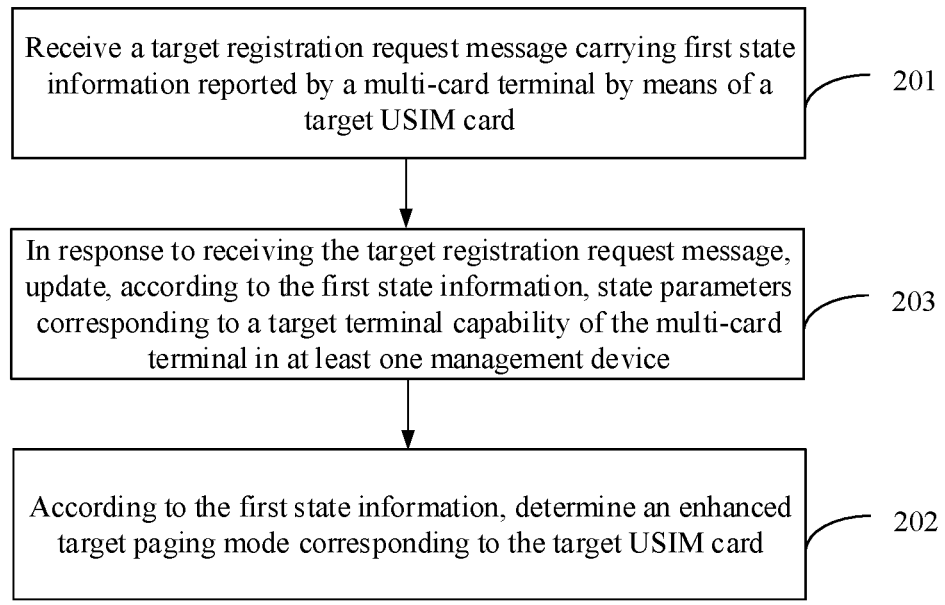
FIG. 6 is a schematic flow diagram of yet another method for paging shown according to an example.

In an alternative example, with reference to FIG. 6, FIG. 6 being a schematic flow diagram of another yet method for paging shown according to the example shown in FIG. 5, the method further includes the following step 203.

In step 203, in response to receiving the target registration request message, update, according to the first state information, state parameters corresponding to the target terminal capability of the multi-card terminal in at least one management device.

In the example of the disclosure, the at least one management device includes, but not limited to, an authentication management function (AMF) device and a data unified management function (DUM) device.

In the above example, after receiving the target registration request message, the network device needs to correspondingly update the state parameters corresponding to the target terminal capability of the multi-card terminal in the at least one management device, so as to subsequently determine the enhanced paging mode, which is simple to implement and has high availability.

Figure 7:
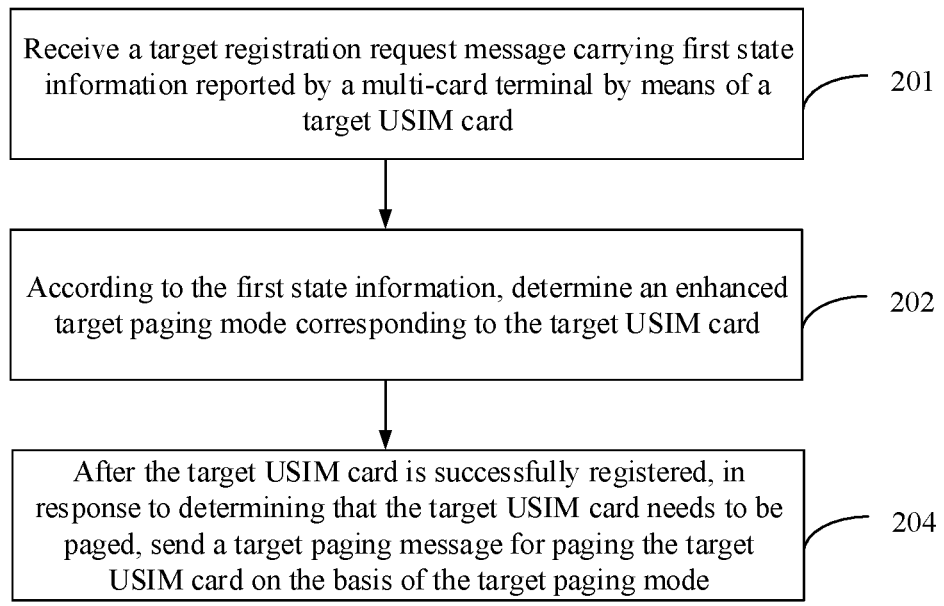
FIG. 7 is a schematic flow diagram of yet another method for paging shown according to an example.

In an alternative example, with reference to FIG. 7, FIG. 7 being a schematic flow diagram of yet another method for paging shown according to the example shown in FIG. 5, the method further includes the following step 204.

In step 204, after the target USIM card is successfully registered, in response to determining that the target USIM card needs to be paged, sending a target paging message for paging the target USIM card based on the target paging mode.

When the target USIM card is the first USIM card, the target paging message is the above first paging message. When the target USIM card is the second USIM card, the target paging mode is the second paging message.

In the above example, the network device may perform paging based on the enhanced target paging mode when needing to page the target USIM card, such that the objective of improving a success rate of the other USIM cards to receive paging messages when one of the USIM cards of the multi-card terminal executes a service is also achieved.

Figure 8:
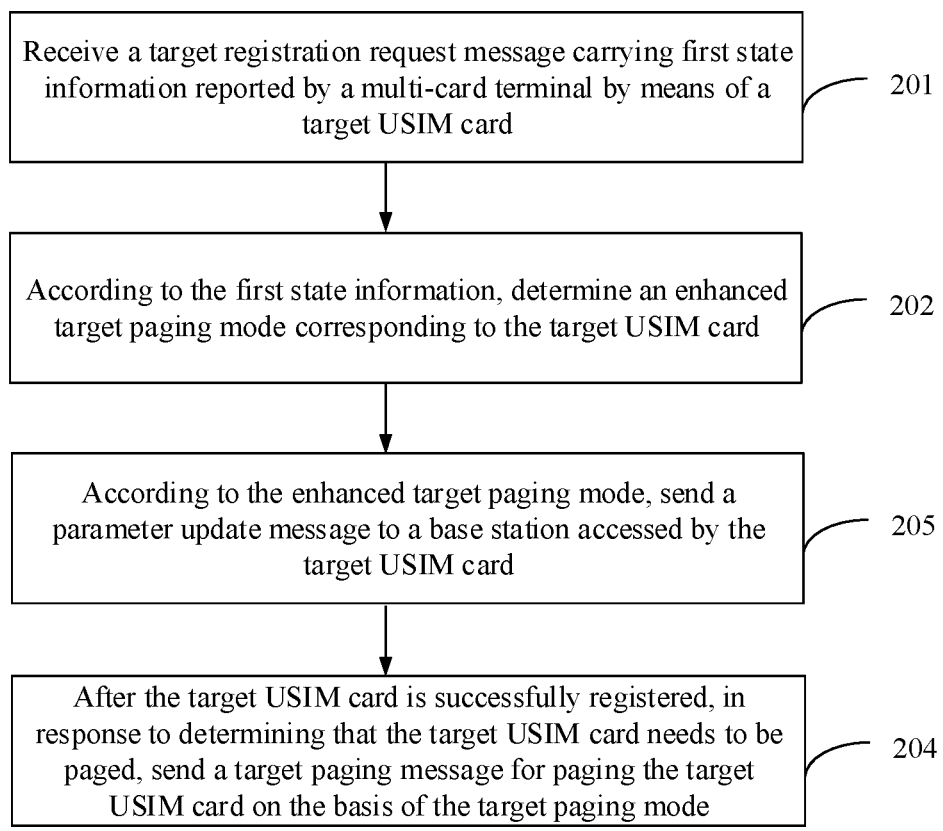
FIG. 8 is a schematic flow diagram of yet another method for paging shown according to an example.

In an alternative example, with reference to FIG. 8, FIG. 8 being a schematic flow diagram of yet another method for paging shown according to the example shown in FIG. 7, after step 202, the method further includes the following step 205.

In step 205, according to the enhanced target paging mode, send a parameter update message to a base station accessed by the target USIM card.

In the example of the disclosure, the parameter update message is used for updating paging parameters corresponding to the target USIM card, recorded in a base station accessed by the target USIM card. The paging parameters corresponding to the target USIM card are already stored in the base station. Since the network device determines the enhanced target paging mode, the paging parameters corresponding to paging of the target USIM card, stored in the base station, need to be updated.

In the above example, when the network device needs to update a wireless access network, i.e. the corresponding paging parameters on a base station side, after determining the enhanced target paging mode, the network device may send the parameter update message to the side of the base station, to update the paging parameters corresponding to the paging of the target USIM card stored in the side of the base station, which has high availability.

Figure 9:
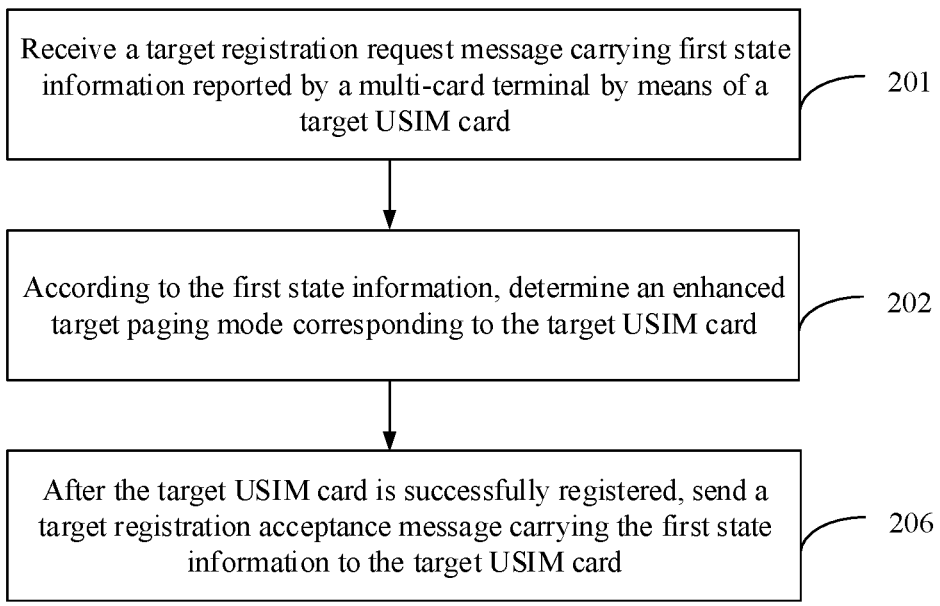
FIG. 9 is a schematic flow diagram of yet another method for paging shown according to an example.

In an alternative example, with reference to FIG. 9, FIG. 9 being a schematic flow diagram of yet another method for paging shown according to the example shown in FIG. 5, the method may further include the following step 206.

In step 206, after the target USIM card is successfully registered, send a target registration acceptance message carrying the first state information to the target USIM card.

In the example of the disclosure, after the target USIM card is successfully registered, the target registration acceptance message may be sent to the target USIM card, such that the target USIM card determines that the target USIM card is successfully registered on the network device based on the target registration acceptance message. When the target USIM card is the first USIM card, the target registration acceptance message is the above first registration acceptance message. When the target USIM card is the second USIM card, the target registration acceptance message is the above second registration acceptance message.

In the above example, the network device may be a first network device corresponding to the first USIM card, or a second network device corresponding to the second USIM card. After the target USIM card is successfully registered, the target registration acceptance message carrying the first state information may be sent to the target USIM card, which is simple to implement and has high availability.

Figure 10:
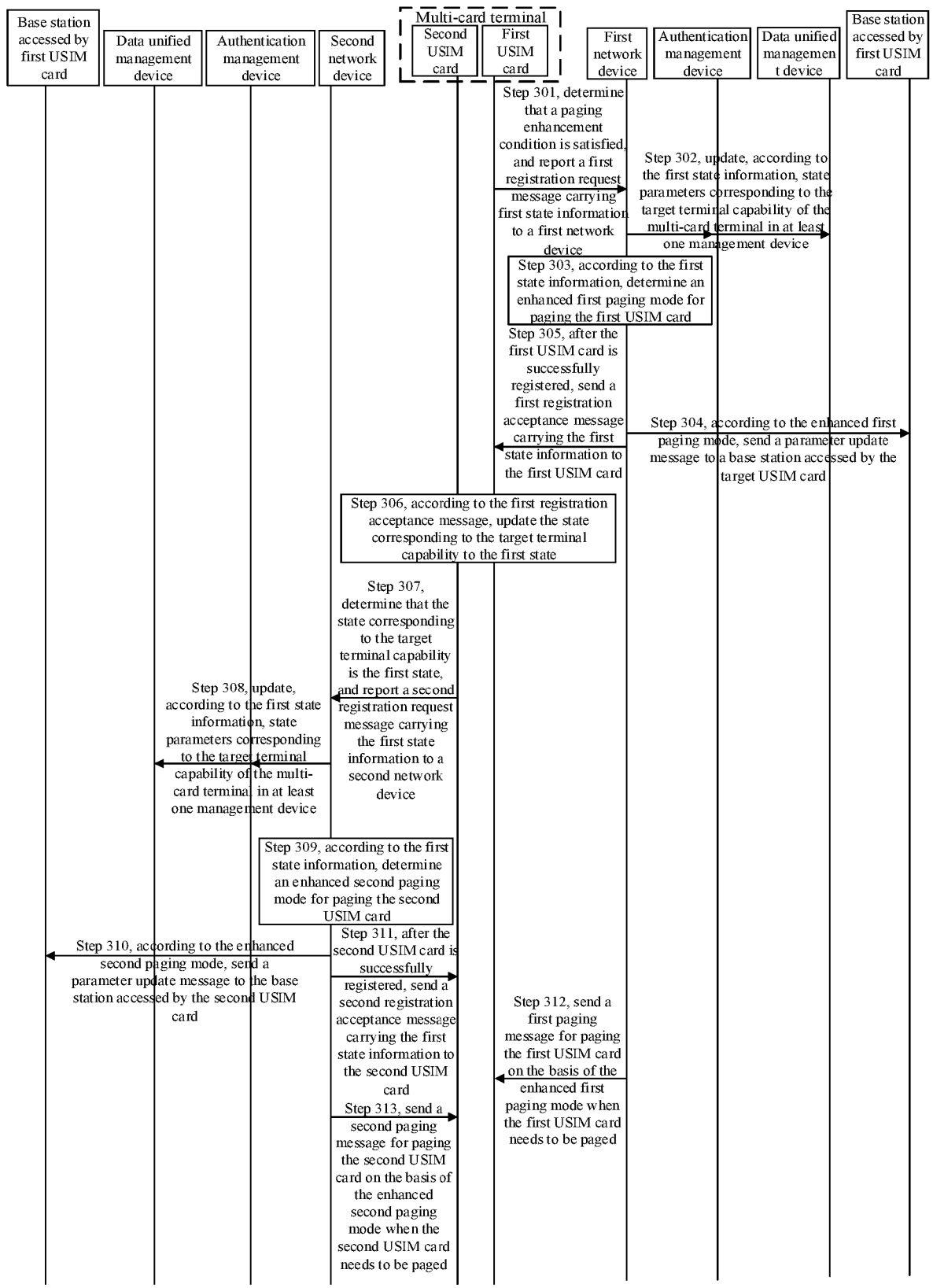
FIG. 10 is a schematic flow diagram of still another method for paging shown according to an example.

In an alternative example, with reference to FIG. 10, FIG. 10 being a schematic flow diagram of a method for paging shown according to an example, the method may include the following steps 301 to 313.

In step 301, determine, by means of a first USIM card of a multi-card terminal, that a paging enhancement condition is satisfied, and report, by the first USIM card, a first registration request message carrying first state information to a first network device.

The paging enhancement condition includes:
a state corresponding to a target terminal capability is already a first state; or a state corresponding to a target terminal capability is a second state, the second state is used for indicating presence of one USIM card in a successfully registered state, and the USIM card in the successfully registered state is different from the first USIM card.

The first state information is used for indicating that the state corresponding to the target terminal capability of the multi-card terminal is a first state, the target terminal capability is used for indicating a capability of the multi-card terminal to support a plurality of USIM cards, and the first state is used for indicating presence of a plurality of USIM cards in the successfully registered state.

Certainly, when the first USIM card determines that the paging enhancement condition is not satisfied, the first USIM card may be registered according to an existing network registration process (which is not shown in FIG. 10).

In step 302, update, by the first network device, according to the first state information, state parameters corresponding to the target terminal capability of the multi-card terminal in at least one management device.

Certainly, when the first registration request message received by the first network device does not carry the first state information, the first network device may complete registration of the first USIM card according to the existing network registration process (which is not shown in FIG. 10).

In step 303, according to the first state information, determine, by the first network device, an enhanced first paging mode for paging the first USIM card.

In step 304, send, by the first network device, a parameter update message to a base station accessed by the first USIM card according to the enhanced first paging mode.

The parameter update message is used for updating paging parameters corresponding to the target USIM card, stored in a base station accessed by the first USIM card.

In step 305, after the first USIM card is successfully registered, send, by the first network device, a first registration acceptance message carrying the first state information to the first USIM card.

In step 306, in response to determining that the state corresponding to the target terminal capability is the second state, and the second state is used for indicating presence of one USIM card in the successfully registered state, update, by the multi-card terminal, the state corresponding to the target terminal capability to the first state according to the first registration acceptance message.

When the state corresponding to the target terminal capability is the second state and merely one USIM card is in a successfully registered state, update, by the multi-card terminal, the state corresponding to the target terminal capability to the first state according to the first registration acceptance message.

In step 307, in response to determining that the state corresponding to the target terminal capability is the first state, report, by a second USIM card of the multi-card terminal, a second registration request message carrying the first state information to a second network device.

In step 308, update, by the second network device, according to the first state information, state parameters corresponding to the target terminal capability of the multi-card terminal in at least one management device.

In step 309, according to the first state information, determine, by the second network device, an enhanced second paging mode for paging the second USIM card.

In step 310, according to the enhanced second paging mode, send, by the second network device, a parameter update message to the base station accessed by the second USIM card.

The parameter update message in the step is used for updating paging parameters corresponding to the second USIM card stored in the base station accessed by the second USIM card.

In step 311, after the second USIM card is successfully registered, send, by the second network device, a second registration acceptance message carrying the first state information to the second USIM card.

In step 312, send, by the first network device, a first paging message for paging the first USIM card based on the enhanced first paging mode when the first USIM card needs to be paged.

In step 313, send, by the second network device, a second paging message for paging the second USIM card based on the enhanced second paging mode when the second USIM card needs to be paged.

From the above example, it may be seen that previously, the mode of solution 17 is used to execute a registration process for 4 times under the condition that the multi-card terminal includes 2 USIM cards. However, the paging solution of the present disclosure is used to reduce the number of registrations to three times. When the number of the first USIM cards or the second USIM cards is large, signaling overheads may be further saved. The disclosure achieves the objective of improving a success rate of the other USIM cards to receiving paging messages when one of the USIM cards of the multi-card terminal executes a service.

in the examples of the disclosure, when the first USIM card in the multi-card terminal determines that the paging enhancement condition is satisfied, the first registration request message carrying the first state information may be reported to the first network device by the first USIM card. The first state information is used for indicating that the state corresponding to the target terminal capability of the multi-card terminal is the first state, the target terminal capability is used for indicating the capability of the multi-card terminal to support a plurality of USIM cards, and the first state is used for indicating presence of a plurality of USIM cards in the successfully registered state. After it is subsequently determined that the first USIM card is successfully registered on the first network device, the first paging message for paging the first USIM card sent by the first network device based on the enhanced first paging mode, may be received. In addition, the second USIM card that is already in the successfully registered state is triggered to execute the registration update process, and subsequently, after the second USIM card is successfully registered, the second paging message for paging the second USIM card sent by the second network device based on the enhanced second paging mode, may be received. In the examples of the disclosure, in the above mode, the network device may page different USIM cards based on the enhanced paging mode, thus improving a success rate of the other USIM cards to receive paging messages when one of the USIM cards of the multi-card terminal executes a service.

In the examples of the disclosure, the network device may receive the target registration request message carrying the first state information reported by the multi-card terminal by means of any USIM card, i.e., the target USIM card.

According to the first state information, the network device determines the enhanced target paging mode corresponding to the target USIM card. Subsequently, the target USIM card is paged based on the enhanced target paging mode under the condition that the target USIM card is successfully registered and it is determined that the target USIM card needs to be paged. The disclosure may use the enhanced target paging mode to page the USIM card according to the first state information carried in the target registration request message reported by any USIM card of the multi-card terminal, such that the objective of improving a success rate of the other USIM cards to receive paging messages when one of the USIM cards of the multi-card terminal executes a service is also achieved.

Corresponding to the above examples of a method for paging, the disclosure further provides an example of an apparatus for paging.

Figure 11:
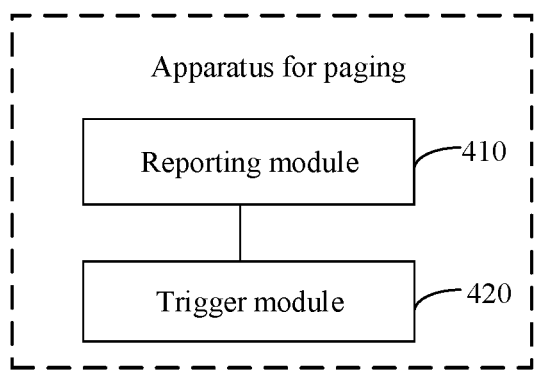
FIG. 11 is a block diagram of an apparatus for paging shown according to an example.

With reference to FIG. 11, FIG. 11 being a block diagram of an apparatus for paging shown according to an example, the apparatus is used for a multi-card terminal, and includes:
  a reporting module 410 configured to report, by a first USIM card, a first registration request message carrying first state information to a first network device in response to determining, by means of the first USIM card, that a paging enhancement condition is satisfied, where the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and
  a trigger module 420 configured to trigger a second USIM card that is already in the successfully registered state to execute a registration update process in response to determining that the state corresponding to the target terminal capability is the first state.

Alternatively, the paging enhancement condition includes:
  the state corresponding to the target terminal capability is already the first state; or
  the state corresponding to the target terminal capability is a second state, the second state is used for indicating presence of one USIM card in the successfully registered state, and the USIM card in the successfully registered state is different from the first USIM card.

Alternatively, the apparatus further includes:
  a first receiving module configured to determine that the first USIM card is successfully registered on the first network device, and receive a first paging message for paging the first USIM card sent by the first network device based on an enhanced first paging mode.

Alternatively, the first receiving module includes:
  a first determination sub-module configured to determine that the first USIM card is successfully registered on the first network device in response to receiving a first registration acceptance message carrying the first state information returned by the first network device.

Alternatively, the apparatus further includes:
  a first update module configured to update the state corresponding to the target terminal capability to the first state according to the first registration acceptance message.

Alternatively, the apparatus further includes:
  a second receiving module configured to determine that the second USIM card completes the registration update process and is successfully registered on a second network device, and receive a second paging message for paging the second USIM card sent by the second network device based on an enhanced second paging mode.

Alternatively, the trigger module includes:
  a reporting sub-module configured to report, by the second USIM card, a second registration request message carrying the first state information to the second network device; and
  the second receiving module includes:
  a second determination sub-module configured to determine that the second USIM card completes the registration update process and is successfully registered on the second network device in response to receiving a second registration acceptance message carrying the first state information returned by the second network device.

Figure 12:
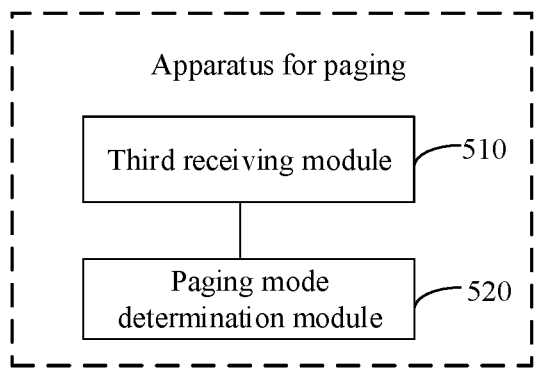
FIG. 12 is a block diagram of another apparatus for paging shown according to an example.

With reference to FIG. 12, FIG. 12 being a block diagram of an apparatus for paging shown according to an example, the apparatus is used for a network device, and includes:
  a third receiving module 510 configured to receive a target registration request message carrying first state information reported by a multi-card terminal by means of a target USIM card, where the target USIM card is any USIM card in the multi-card terminal, the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and
  a paging mode determination module 520 configured to determine an enhanced target paging mode corresponding to the target USIM card according to the first state information.

Alternatively, the apparatus further includes:
  a second update module configured to update, according to the first state information, state parameters corresponding to the target terminal capability of the multi-card terminal in at least one management device in response to receiving the target registration request message.

Alternatively, the apparatus further includes:
  a first sending module configured to send a target paging message for paging the target USIM card based on the target paging mode in response to determining that the target USIM card needs to be paged after the target USIM card is successfully registered.

Alternatively, the apparatus further includes:
  a second sending module configured to send a parameter update message to a base station accessed by the target USIM card according to the enhanced target paging mode, the parameter update message being used for updating paging parameters corresponding to the target USIM card stored in the base station.

Alternatively, the apparatus further includes:
  a third sending module configured to send a target registration acceptance message carrying the first state information to the target USIM card after the target USIM card is successfully registered. Since the apparatus example substantially corresponds to the method example, it is sufficient to refer to a part of the description of the method example where relevant. The apparatus example described above is merely schematic, where the unit described as a separate component may or may not be physically separated, and a component displayed as a unit may or may not be a physical unit, that is, the component may be located at one place, or distributed on a plurality of network units. Some or all of modules in the apparatus example may be selected according to actual needs to implement the solutions of the disclosure. Those of ordinary skill in the art can understand and implement the disclosure without making the inventive effort.

Correspondingly, the disclosure further provides a computer-readable storage medium. The storage medium stores a computer program, where the computer program is used for executing any method for paging described above for a multi-card terminal side.

Correspondingly, the disclosure further provides a computer-readable storage medium. The storage medium stores a computer program, where the computer program is used for executing any method for paging described above for a network device side.

Correspondingly, the disclosure further provides an apparatus for paging. The apparatus for paging includes:
a processor; and
a memory for storing a processor-executable instruction, where
the processor is configured to execute any method for paging described above for a multi-card terminal side.

Figure 13:
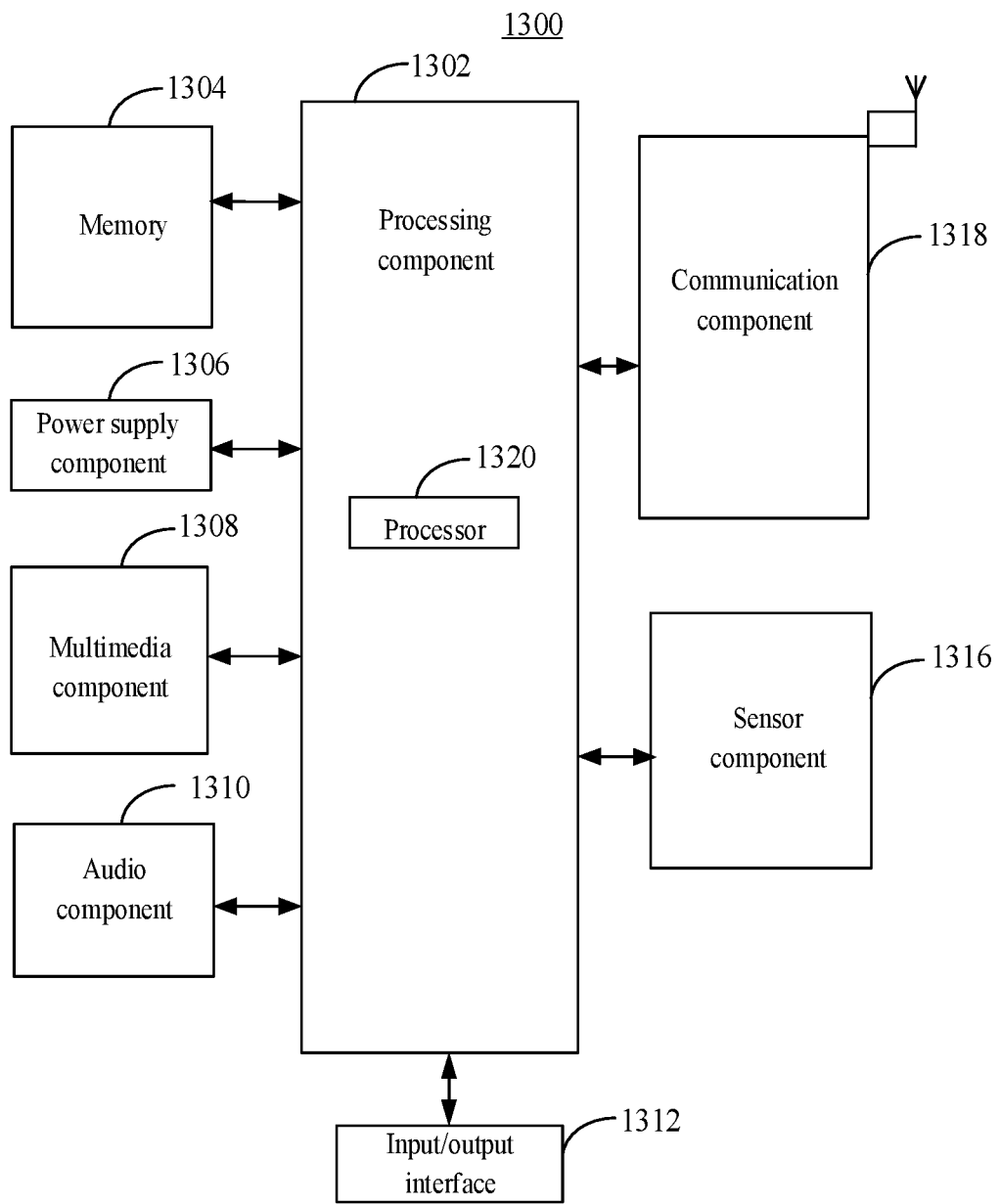
FIG. 13 is a schematic structural diagram of an apparatus for paging shown according to an example of the disclosure.

FIG. 13 is a block diagram of an electronic device 1300 shown according to an example. For example, the electronic device 1300 may be a multi-card terminal including a plurality of USIM cards, such as a mobile phone, a tablet computer, an e-book reader, a multimedia playback device, a wearable device, a vehicle-mounted terminal, an iPad, a smart television, etc.

With reference to FIG. 13, the electronic device 1300 may include one or more of the following components: a processing component 1302, a memory 1304, a power supply component 1306, a multimedia component 1308, an audio component 1310, an input/output (I/O) interface 1312, a sensor component 1316 and a paging component 1318.

The processing component 1302 generally controls overall operations of the electronic device 1300, such as operations associated with display, phone calls, data paging, camera operations and recording operations. The processing component 1302 may include one or more processors 1320 to execute instructions, so as to complete all or part of steps of the above method for paging. Further, the processing component 1302 may include one or more modules that facilitate interaction between the processing component 1302 and other components. For example, the processing component 1302 may include a multimedia module, so as to facilitate interaction between the multimedia component 1308 and the processing component 1302. For another example, the processing component 1302 may read the executable instruction from the memory, so as to implement steps of the method for paging provided in the examples.

The memory 1304 is configured to store various types of data, so as to support operation at the electronic device 1300. Examples of such data include instructions, contact data, phone book data, messages, pictures, videos, etc., for any application or method operated on the electronic device 1300. The memory 1304 may be implemented by any type of volatile or non-volatile storage device, or a combination of any type of volatile or non-volatile storage device, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 1306 provides power for various components of the electronic device 1300. The power supply component 1306 may include a power management system, one or more power supplies, and other components associated with generation, management and distribution of power for the electronic device 1300.

The multimedia component 1308 includes a display screen that provides an output interface between the electronic device 1300 and a user. In some examples, the multimedia component 1308 includes a front-facing camera and/or a rear-facing camera. When the electronic device 1300 is in an operation mode, such as a photographing mode or a video mode, the front-facing camera and/or the rear-facing camera may receive external multimedia data. Each front-facing camera and each rear-facing camera may be a fixed optical lens system or have a focal length and an optical zoom capability.

The audio component 1310 is configured to output and/or input an audio signal. For example, the audio component 1310 includes a microphone (MIC). The MIC is configured to receive the external audio signal when the electronic device 1300 is in an operation mode, such as a calling mode, a recording mode and a voice recognition mode. The received audio signal may be further stored in the memory 1304 or sent by means of the paging component 1318. In some examples, an audio component 1310 further includes a loudspeaker for outputting the audio signal.

The I/O interface 1312 provides interfaces between the processing component 1302 and peripheral interface modules. The peripheral interface modules may be keyboards, click wheels, buttons, etc. These buttons may include, but are not limited to, a home button, a volume button, a start button, and a lock button.

The sensor component 1316 includes one or more sensors for providing state evaluation of various aspects for the electronic device 1300. For example, the sensor component 1316 may detect an open/close state of the electronic device 1300, and relative positioning of the components. For example, the component is a display and a keypad of the electronic device 1300. The sensor component 1316 may further detect a change in position of the electronic device 1300 or a component of the electronic device 1300, presence or absence of the user making contact with the electronic device 1300, an orientation or acceleration/deceleration of the electronic device 1300, and a change in temperature of the electronic device 1300. The sensor component 1316 may include a proximity sensor configured to be used for detecting presence of nearby objects without any physical contact. The sensor component 1316 may further include a light sensor, such as a complementary metal-oxide-semiconductor (CMOS) image sensor or a charge coupled device (CCD) image sensor, used in imaging applications. In some examples, the sensor component 1316 may further include an acceleration sensor, a gyro sensor, a magnetic sensor, a pressure sensor, or a temperature sensor.

The paging component 1318 is configured to facilitate paging between the electronic device 1300 and other devices in a wired or wireless mode. The electronic device 1300 may access a wireless network based on a paging standard, such as wireless fidelity (Wi-Fi), second generation (2G), third generation (3G), fourth generation (4G), fifth generation (5G), or sixth generation (6G), or a combination of the Wi-Fi, the 2G, the 3G, the 4G, the 5G and the 6G. In an example, the paging component 1318 receives a broadcast signal or broadcast related information from an external broadcast management system by means of a broadcast channel. In an example, the paging component 1318 further includes a near field communication (NFC) module, so as to facilitate short-range paging. For example, the NFC module may be implemented based on a radio frequency identification (RFID) technology, an infrared data association (IrDA) technology, a ultra-wide band (UWB) technology, a Bluetooth (BT) technology, and other technologies.

In an example, the electronic device 1300 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, micro-processors or other electronic elements, and is used for executing any method for paging described above for a multi-card terminal side.

In an example, a non-transitory machine-readable storage medium including an instruction is further provided, such as the memory 1304 including an instruction. The instruction is executable by the processor 1320 of the electronic device 1300, so as to complete the method for paging. For example, the non-transitory computer-readable storage medium may be a ROM, a random access memory (RAM), a compact disc read-only memory (CD-ROM), a magnetic tape, a floppy disk, an optical data storage device, etc.

Correspondingly, the disclosure further provides an apparatus for paging. The apparatus for paging includes:
a processor; and
a memory for storing a processor-executable instruction, where
the processor is configured to execute any method for paging described above for a network device side.

Figure 14:
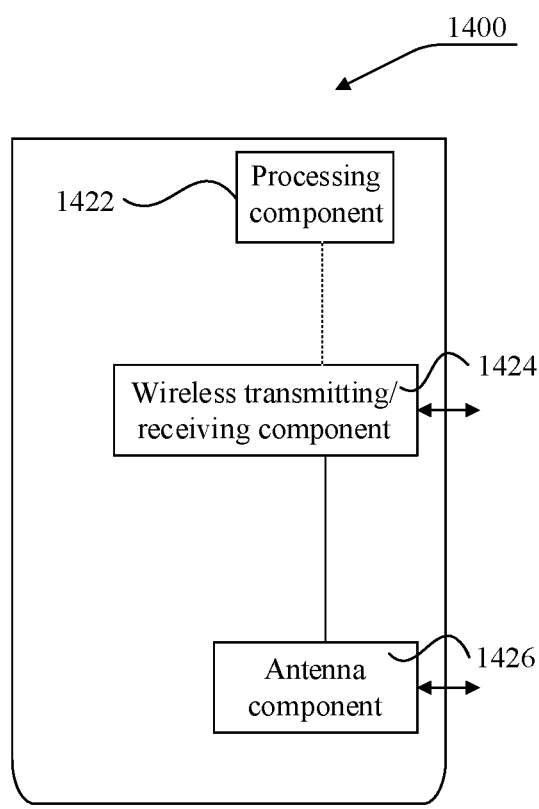
FIG. 14 is a schematic structural diagram of another apparatus for paging shown according to an example of the disclosure.

With reference to FIG. 14, FIG. 14 is a schematic structural diagram of another apparatus for paging 1400 shown according to an example. The apparatus 1400 may be provided as a base station. With reference to FIG. 14, the apparatus 1400 includes a processing component 1422, a wireless transmitting/receiving component 1424, an antenna component 1426, and a signal processing portion unique to a wireless interface. The processing component 1422 may further include one or more processors.

One of processors in the processing component 1422 may be configured to execute the method for paging of any one of network device sides.

Those skilled in the art could easily conceive of other implementation solutions of the disclosure upon consideration of the description and the invention disclosed in the implementation. The disclosure is intended to cover any variations, uses or adaptive changes of the disclosure, which follow the general principles of the disclosure and include common general knowledge or customary technical means in the technical field not disclosed in the disclosure. The description and the examples are to be regarded as illustrative merely, and the true scope and spirit of the disclosure are indicated by the appended claims.

It should be understood that the disclosure is not limited to a precise structure which has been described above and illustrated in the accompanying drawings, and may have various modifications and changes without departing from the scope of the disclosure. The scope of the disclosure is limited by the appended claims merely.

According to a first aspect of an example of the disclosure, a method for paging is provided. The method is performed by a multi-card terminal, and includes:
determining, by means of a first universal subscriber identity module (USIM) card, that a paging enhancement condition is satisfied, reporting, by the first USIM card, a first registration request message carrying first state information to a first network device, where the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and
determining that the state corresponding to the target terminal capability is the first state, triggering a second USIM card that is already in the successfully registered state to execute a registration update process.

Alternatively, the paging enhancement condition includes at least one of:
the state corresponding to the target terminal capability is already the first state; and
the state corresponding to the target terminal capability is a second state, the second state is used for indicating presence of one USIM card in the successfully registered state, and the USIM card in the successfully registered state is different from the first USIM card.

Alternatively, the method further includes:
determining that the first USIM card is successfully registered on the first network device, and receiving a first paging message for paging the first USIM card sent by the first network device based on an enhanced first paging mode.

Alternatively, the determining that the first USIM card is successfully registered on the first network device includes:
receiving a first registration acceptance message carrying the first state information returned by the first network device, determining that the first USIM card is successfully registered on the first network device.

Alternatively, the state corresponding to the target terminal capability is the second state, the second state is used for indicating presence of one USIM card in the successfully registered state, and the method further includes:
according to the first registration acceptance message, updating the state corresponding to the target terminal capability to the first state.

Alternatively, the method further includes:
determining that the second USIM card completes the registration update process and is successfully registered on a second network device, and receiving a second paging message for paging the second USIM card sent by the second network device based on an enhanced second paging mode.

Alternatively, the triggering a second USIM card that is already in the successfully registered state to execute a registration update process includes:
reporting, by the second USIM card, a second registration request message carrying the first state information to the second network device; and
the determining that the second USIM card completes the registration update process and is successfully registered on a second network device includes:
receiving a second registration acceptance message carrying the first state information returned by the second network device, determining that the second USIM card completes the registration update process and is successfully registered on the second network device.

According to a second aspect of an example of the disclosure, a method for paging is provided. The method is used for a network device, and includes:

receiving a target registration request message carrying first state information reported by a multi-card terminal by means of a target USIM card, where the target USIM card is any USIM card in the multi-card terminal, the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and according to the first state information, determining an enhanced target paging mode corresponding to the target USIM card.

Alternatively, the method further includes:

receiving the target registration request message, updating, according to the first state information, state parameters corresponding to the target terminal capability of the multi-card terminal in at least one management device.

Alternatively, the method further includes:

after the target USIM card is successfully registered, determining that the target USIM card needs to be paged, sending a target paging message for paging the target USIM card based on the target paging mode.

Alternatively, after the determining an enhanced target paging mode corresponding to the target USIM card, the method further includes:

according to the enhanced target paging mode, sending a parameter update message to a base station accessed by the target USIM card, the parameter update message being used for updating paging parameters corresponding to the target USIM card stored in a base station.

Alternatively, the method further includes:

after the target USIM card is successfully registered, sending a target registration acceptance message carrying the first state information to the target USIM card.

According to a third aspect of an example of the disclosure, an apparatus for paging is provided. The apparatus is used for a multi-card terminal, and includes:

a reporting module configured to report, by a first USIM card, a first registration request message carrying first state information to a first network device determining, by means of the first USIM card, that a paging enhancement condition is satisfied, where the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and a trigger module configured to trigger a second USIM card that is already in the successfully registered state to execute a registration update process determining that the state corresponding to the target terminal capability is the first state.

Alternatively, the paging enhancement condition includes at least one of:

the state corresponding to the target terminal capability is already the first state; and the state corresponding to the target terminal capability is a second state, the second state is used for indicating presence of one USIM card in the successfully registered state, and the USIM card in the successfully registered state is different from the first USIM card.

Alternatively, the apparatus further includes:

a first receiving module configured to determine that the first USIM card is successfully registered on the first network device, and receive a first paging message for paging the first USIM card sent by the first network device based on an enhanced first paging mode.

Alternatively, the first receiving module includes:

a first determination sub-module configured to determine that the first USIM card is successfully registered on the first network device receiving a first registration acceptance message carrying the first state information returned by the first network device.

Alternatively, the apparatus further includes:

a first update module configured to update the state corresponding to the target terminal capability to the first state according to the first registration acceptance message.

Alternatively, the apparatus further includes:

a second receiving module configured to determine that the second USIM card completes the registration update process and is successfully registered on a second network device, and receive a second paging message for paging the second USIM card sent by the second network device based on an enhanced second paging mode.

Alternatively, the trigger module includes:

a reporting sub-module configured to report, by the second USIM card, a second registration request message carrying the first state information to the second network device; and the second receiving module includes:

a second determination sub-module configured to determine that the second USIM card completes the registration update process and is successfully registered on the second network device receiving a second registration acceptance message carrying the first state information returned by the second network device.

According to a fourth aspect of an example of the disclosure, an apparatus for paging is provided. The apparatus is used for a network device, and includes:

a third receiving module configured to receive a target registration request message carrying first state information reported by a multi-card terminal by means of a target USIM card, where the target USIM card is any USIM card in the multi-card terminal, the first state information is used for indicating that a state corresponding to a target terminal capability of the multi-card terminal is a first state, the target terminal capability is used for indicating a capability of the multi-card terminal to support a plurality of USIM cards, and the first state is used for indicating presence of a plurality of USIM cards in a successfully registered state; and a paging mode determination module configured to determine an enhanced target paging mode corresponding to the target USIM card according to the first state information.

Alternatively, the apparatus further includes:

a second update module configured to update, according to the first state information, state parameters corresponding to the target terminal capability of the multi-card terminal in at least one management device receiving the target registration request message.

Alternatively, the apparatus further includes:

a first sending module configured to send a target paging message for paging the target USIM card based on the target paging mode determining that the target USIM card needs to be paged after the target USIM card is successfully registered.

Alternatively, the apparatus further includes:

a second sending module configured to send a parameter update message to a base station accessed by the target USIM card according to the enhanced target paging mode, the parameter update message being used for updating paging parameters corresponding to the target USIM card stored in the base station.

Alternatively, the apparatus further includes:

a third sending module configured to send a target registration acceptance message carrying the first state information to the target USIM card after the target USIM card is successfully registered.

According to a fifth aspect of an example of the disclosure, a computer-readable storage medium is provided. The computer-readable storage medium stores a computer program. The computer program is used for executing the method for paging of any one of the first aspect above.

According to a sixth aspect of an example of the disclosure, a computer-readable storage medium is provided. The computer-readable storage medium stores a computer program. The computer program is used for executing the method for paging of any one of the second aspect above.

According to a seventh aspect of an example of the disclosure, an apparatus for paging is provided. The apparatus includes:

a processor; and a memory for storing a processor-executable instruction, where the processor is configured to execute the method for paging of any one of the first aspect above.

According to an eighth aspect of an example of the disclosure, an apparatus for paging is provided. The apparatus includes:

a processor; and a memory for storing a processor-executable instruction, where the processor is configured to execute the method for paging of any one of the second aspect above.

What is claimed is:

1. A method for paging, performed by a multi-card terminal, and comprising:

determining, by means of a first universal subscriber identity module (USIM) card, that a paging enhancement condition is satisfied;

reporting, by the first USIM card, a first registration request message carrying first state information to a first network device, wherein the first state information is used for indicating that a state corresponding to a target terminal capability of the multi-card terminal is a first state, the target terminal capability is used for indicating a capability of the multi-card terminal to support a plurality of USIM cards, and the first state is used for indicating a presence of the plurality of USIM cards in a successfully registered state, wherein all of the plurality of USIM cards are in a successfully registered state; and determining that the state corresponding to the target terminal capability is the first state, and triggering a second USIM card that is already in the successfully registered state to execute a registration update process, wherein the registration update process is configured to register the second USIM card on a second network device; and paging in an enhanced target paging mode, wherein the enhanced target paging mode is to increase number of times to page when one of the USIM cards of the multi-card terminal is executing a service.

2. The method according to claim 1, wherein the paging enhancement condition comprises:

the state corresponding to the target terminal capability is already the first state; or the state corresponding to the target terminal capability is a second state, the second state is used for indicating presence of a USIM card in the successfully registered state, and the USIM card in the successfully registered state is different from the first USIM card.

3. The method according to claim 1, further comprising:

determining that the first USIM card is successfully registered on the first network device, and receiving a first paging message for paging the first USIM card sent by the first network device based on an enhanced first paging mode.

4. The method according to claim 3, wherein the determining that the first USIM card is successfully registered on the first network device comprises:

receiving a first registration acceptance message carrying the first state information returned by the first network device, and determining that the first USIM card is successfully registered on the first network device.

5. The method according to claim 4, wherein the state corresponding to the target terminal capability is a second state, the second state is used for indicating presence of one USIM card in the successfully registered state, and the method further comprises:

according to the first registration acceptance message, updating the state corresponding to the target terminal capability to the first state.

6. The method according to claim 1, further comprising:

determining that the second USIM card completes the registration update process and is successfully registered on a second network device, and receiving a second paging message for paging the second USIM card sent by the second network device based on an enhanced second paging mode.

7. The method according to claim 6, wherein the triggering a second USIM card that is already in the successfully registered state to execute a registration update process comprises:

reporting, by the second USIM card, a second registration request message carrying the first state information to the second network device; and the determining that the second USIM card completes the registration update process and is successfully registered on a second network device comprises:

receiving a second registration acceptance message carrying the first state information returned by the second network device, and determining that the second USIM card completes the registration update process and is successfully registered on the second network device.

8. A method for paging, performed by a network device, and comprising:

receiving a target registration request message carrying first state information reported by a multi-card terminal by means of a target USIM card, wherein the target USIM card is any USIM card in the multi-card terminal, the first state information is used for indicating that a state corresponding to a target terminal capability of the multi-card terminal is a first state, the target terminal capability is used for indicating a capability of the multi-card terminal to support a plurality of USIM cards, and the first state is used for indicating a presence of the plurality of USIM cards in a successfully registered state, wherein all of the USIM cards are in a successfully registered state; and according to the first state information, determining an enhanced target paging mode corresponding to the target USIM card; and paging in an enhanced target paging mode, wherein the enhanced target paging mode is to increase number of times to page when one of the USIM cards of the multi-card terminal is executing a service.

9. The method according to claim 8, further comprising:
receiving the target registration request message, and updating, according to the first state information, state parameters corresponding to the target terminal capability of the multi-card terminal in at least one management device.

10. The method according to claim 8, further comprising:
after the target USIM card is successfully registered, determining that the target USIM card needs to be paged, sending a target paging message for paging the target USIM card based on the enhanced target paging mode.

11. The method according to claim 10, wherein after the determining an enhanced target paging mode corresponding to the target USIM card, the method further comprises:
according to the enhanced target paging mode, sending a parameter update message to a base station accessed by the target USIM card, the parameter update message being used for updating paging parameters corresponding to the target USIM card stored in the base station.

12. The method according to claim 8, further comprising:
after the target USIM card is successfully registered, sending a target registration acceptance message carrying the first state information to the target USIM card.

13. A non-transitory computer-readable storage medium, storing a computer program, wherein the computer program is used for executing the method for paging of claim 1.

14. A non-transitory computer-readable storage medium, storing a computer program, wherein the computer program is used for executing the method for paging of claim 8.

15. An apparatus for paging, comprising:
a processor; and
a memory for storing a processor-executable instruction, wherein the processor is configured to:
determine, by means of a first universal subscriber identity module (USIM) card, that a paging enhancement condition is satisfied, reporting, by the first USIM card, a first registration request message carrying first state information to a first network device, wherein the first state information is used for indicating that a state corresponding to a target terminal capability of a multi-card terminal is a first state, the target terminal capability is used for indicating a capability of the multi-card terminal to support a plurality of USIM cards, and the first state is used for indicating a presence of the plurality of USIM cards in a successfully registered state, wherein all of the plurality of USIM cards are in a successfully registered state; and determine that the state corresponding to the target terminal capability is the first state, triggering a second USIM card that is already in the successfully registered state to execute a registration update process, wherein the registration update process is configured to register the second USIM card on a second network device; and paging in an enhanced target paging mode, wherein the enhanced target paging mode is to increase number of times to page when one of the USIM cards of the multi-card terminal is executing a service.

16. An apparatus for paging, comprising:
a processor; and
a memory for storing a processor-executable instruction, wherein
the processor is configured to execute the method for paging of claim 8.

17. The apparatus according to claim 15, wherein the paging enhancement condition comprises at least one of:
the state corresponding to the target terminal capability is already the first state; and
the state corresponding to the target terminal capability is a second state, the second state is used for indicating presence of a USIM card in the successfully registered state, and the USIM card in the successfully registered state is different from the first USIM card.

18. The apparatus according to claim 15, wherein the processor is further configured to:
determine that the first USIM card is successfully registered on the first network device, and receive a first paging message for paging the first USIM card sent by the first network device based on an enhanced first paging mode.

19. The apparatus according to claim 18, wherein the processor is further configured to:
receive a first registration acceptance message carrying the first state information returned by the first network device, and determine that the first USIM card is successfully registered on the first network device.

20. The apparatus according to claim 19, wherein the state corresponding to the target terminal capability is a second state, the second state is used for indicating presence of one USIM card in the successfully registered state, and the processor is further configured to:
according to the first registration acceptance message, update the state corresponding to the target terminal capability to the first state.

* * * * *